US012275046B2

(12) United States Patent
Li et al.

(10) Patent No.: US 12,275,046 B2
(45) Date of Patent: Apr. 15, 2025

(54) SLURRY IRON REMOVER

(71) Applicant: CONTEMPORARY AMPEREX TECHNOLOGY (HONG KONG) LIMITED, Hong Kong (CN)

(72) Inventors: Yuanxin Li, Ningde (CN); Bo Zhang, Ningde (CN); Liyong Xu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/586,367

(22) Filed: Feb. 23, 2024

(65) Prior Publication Data

US 2024/0189871 A1 Jun. 13, 2024

Related U.S. Application Data

(63) Continuation of application No. PCT/CN2022/122019, filed on Sep. 28, 2022.

(30) Foreign Application Priority Data

Mar. 8, 2022 (CN) ......................... 202210227943.2

(51) Int. Cl.
*B08B 9/087* (2006.01)
*B03C 1/30* (2006.01)
*B08B 1/16* (2024.01)

(52) U.S. Cl.
CPC ................ *B08B 9/087* (2013.01); *B03C 1/30* (2013.01); *B08B 1/165* (2024.01)

(58) Field of Classification Search
CPC .......... B08B 9/087; B08B 1/165; B08B 1/16; B08B 1/30; B03C 1/30; B03C 1/0332;
(Continued)

(56) References Cited

U.S. PATENT DOCUMENTS

2021/0322999 A1 10/2021 Yazdanbakhsh et al.
2022/0288604 A1* 9/2022 Simonson ............... B03C 1/284

FOREIGN PATENT DOCUMENTS

CN 204293943 U 4/2015
CN 208230116 U 12/2018
(Continued)

OTHER PUBLICATIONS

The World Intellectual Property Organization (WIPO) International Search Report and Written Opinion for PCT/CN2022/122019 Nov. 22, 2022 11 Pages (including translation).
(Continued)

*Primary Examiner* — Jacob S. Scott
*Assistant Examiner* — Miraj T. Patel
(74) *Attorney, Agent, or Firm* — ANOVA LAW GROUP, PLLC

(57) ABSTRACT

A slurry iron remover includes a tank body configured to contain slurry; a magnetic bar disposed in the tank body, where the magnetic bar is configured to absorb iron particles in the slurry; and a cleaning column ring disposed in the tank body and surrounding the magnetic bar, where the cleaning column ring is fitted to an outer surface of the magnetic bar and an inner surface of the tank body respectively, and the cleaning column ring is configured to move along an axial direction of the magnetic bar after the slurry is discharged from the tank body to clean the tank body and the magnetic bar.

15 Claims, 5 Drawing Sheets

1

(58) Field of Classification Search
CPC .... B03C 1/02; B03C 1/14; B03C 1/28; B03C 1/284; B03C 1/286
See application file for complete search history.

(56) References Cited

FOREIGN PATENT DOCUMENTS

| | | | |
|---|---|---|---|
| CN | 211649018 | U | 10/2020 |
| GB | 2409829 | A | 7/2005 |
| WO | 2021026659 | A1 | 2/2021 |

OTHER PUBLICATIONS

The European Patent Office (EPO) The Extended European Search Report for Application No. 22930555.2 Dec. 10, 2024 12 Pages.

* cited by examiner

SLURRY IRON REMOVER

CROSS-REFERENCE TO RELATED APPLICATIONS

The present application is a continuation of International Application No. PCT/CN2022/122019, filed on Sep. 28, 2022, which claims priority to Chinese patent application No. 202210227943.2 filed on Mar. 8, 2022 and entitled “Slurry Iron Remover”, the entire contents of both of which are incorporated herein by reference.

TECHNICAL FIELD

The present application relates to the field of battery technology, and more specifically, to a slurry iron remover.

BACKGROUND

With the increasing environmental pollution, the new energy industry has attracted more and more attention from people. In the new energy industry, battery technology is an important factor for its development.

In the development of battery technology, liquid slurry for manufacturing a battery often contains certain iron components, which will affect the quality of the battery. How to remove metal iron particles in battery slurry and ensure safety of a production process is an urgent technical problem in battery technology that needs to be solved.

SUMMARY

In view of the above problems, embodiments of the present application provide a slurry iron remover, which can not only enable the slurry iron remover to automatically clean slurry and improve iron removal effect and efficiency, but also can clean the interior of a device without opening the device and ensure safety during the cleaning process.

In a first aspect, there is provided a slurry iron remover, including: a tank body configured to contain slurry; a magnetic bar disposed in the tank body, where the magnetic bar is configured to absorb iron particles in the slurry; and a cleaning column ring disposed in the tank body and surrounding the magnetic bar, where the cleaning column ring is fitted to an outer surface of the magnetic bar and an inner surface of the tank body respectively, and the cleaning column ring is configured to move along an axial direction of the magnetic bar after the slurry is discharged from the tank body to clean the tank body and the magnetic bar.

In the embodiment of the present application, the magnetic bar is disposed in the tank body, and the magnetic bar can absorb iron particles in the slurry contained in the tank body. The cleaning column ring is disposed in the tank body and surrounds the magnetic bar. In this way, when the cleaning column ring moves along the axial direction of the magnetic bar, the tank body and the magnetic bar can be cleaned, so as to enable the slurry iron remover to automatically clean a component in the interior of a device. The cleaning column ring is fitted to the tank body and the magnetic bar to comprehensively clean the tank body and the magnetic bar, so as to improve cleaning effect of the device. Moreover, the device does not need to be opened in the process of automatic cleaning of the slurry iron remover. Therefore, on the one hand, no chemicals will be exposed to the air, which meets chemical safety requirements, and on the other hand, safety risks caused by opening the device can be reduced.

In one possible implementation manner, the cleaning column ring includes: a column ring body; an inner scraping diaphragm disposed on an inner surface of the column ring body and fitted to the outer surface of the magnetic bar, where the inner scraping diaphragm is configured to clean the magnetic bar; and an outer scraping diaphragm disposed on an outer surface of the column ring body and fitted to the inner surface of the tank body, where the outer scraping diaphragm is configured to clean the tank body.

In the embodiment of the present application, the inner scraping diaphragm and the outer scraping diaphragm are disposed in the cleaning column ring. The inner scraping diaphragm is configured to clean the magnetic bar, and the outer scraping diaphragm is configured to clean the tank body. By setting different cleaning components on the cleaning column ring, the inner surface of the tank body and the outer surface of the magnetic bar can be cleaned simultaneously, thereby improving self-cleaning effect of components such as the magnetic bar and the tank body in the slurry iron remover.

In one possible implementation manner, the inner scraping diaphragm and the outer scraping diaphragm are each in a sheet-shaped circular ring structure.

In the embodiment of the present application, the cleaning column ring is disposed in the tank body and surrounds the magnetic bar. When the inner scraping diaphragm and the outer scraping diaphragm on the cleaning column ring are both in a sheet-shaped circular ring structure, the inner scraping diaphragm and the outer scraping diaphragm can respectively clean all parts of the magnetic bar and the tank body to avoid an uncleaned region on the magnetic bar and the tank body.

In one possible implementation manner, the cleaning column ring includes a plurality of inner scraping diaphragms and a plurality of outer scraping diaphragms distributed along the axial direction of the magnetic bar.

In the embodiment of the present application, the cleaning column ring surrounds the magnetic bar. When the plurality of inner scraping diaphragms and the plurality of outer scraping diaphragms are distributed along the axial direction of the magnetic bar, both the entire outer surface of the magnetic bar and the inner surface of the tank body can be cleaned by the inner scraping diaphragms and the outer scraping diaphragms. Moreover, part of the outer surface region of the magnetic bar and part of the inner surface region of the tank body can be cleaned multiple times, and setting the plurality of inner scraping diaphragms and outer scraping diaphragms at the same time can improve the cleaning efficiency.

In one possible implementation manner, before the slurry enters the tank body, the cleaning column ring is located in a first region of the magnetic bar; after the slurry enters the tank body, the slurry covers a second region of the tank body, and the first region and the second region do not overlap; and after the slurry is discharged from the tank body, the cleaning column ring moves into the second region along the axial direction of the magnetic bar to clean the tank body and the magnetic bar.

In the embodiment of the present application, when there is no slurry in the tank body, the cleaning column ring is located at the upper part of the magnetic bar, that is, the first region. When the slurry enters the tank body, the slurry covers the second region of the tank body, and after the magnetic bar adsorbs the iron particles, the slurry is discharged from the tank body. The cleaning column ring moves along the axial direction of the magnetic bar, so that the cleaning column ring moves from the first region to the second region to clean the magnetic bar and the tank body. The slurry iron remover can automatically clean the component in the interior of the device, and can save operation and maintain manpower.

In one possible implementation manner, an outer surface of the cleaning column ring is provided with a first restraint structure, the inner surface of the tank body is provided with a second restraint structure, and the first restraint structure and the second restraint structure are configured to fix the cleaning column ring to the first region of the magnetic bar.

In the embodiment of the present application, before the cleaning column ring cleans the magnetic bar and the tank body, the cleaning column ring is fixedly disposed in the first region of the magnetic bar. If the cleaning column ring is located in the second region, it will prevent the slurry from entering the tank body, thereby affecting the effect of the magnetic bar on adsorbing the iron particles in the slurry. By setting the first restraint structure and the second restraint structure on the outer surface of the cleaning column ring and the inner surface of the tank body respectively, the first restraint structure cooperates with the second restraint structure, so as to realize the fixing of the cleaning column ring on the tank body, thereby ensuring normal operation of the slurry iron remover.

In one possible implementation manner, the first restraint structure includes a restraint groove, the second restraint structure includes a restraint block, and the restraint block snaps into the restraint groove to fix the cleaning column ring to the first region of the magnetic bar.

In the embodiment of the present application, the restraint block is disposed on the inner surface of the tank body, and the restraint groove is disposed on the outer surface of the cleaning column ring. The fixing of the cleaning column ring to the first region of the magnetic bar is realized through the cooperation of the restraint groove and the restraint block. This method has low cost, low energy consumption and good practical performance.

In one possible implementation manner, the restraint block moves out of the restraint groove so that the cleaning column ring moves along the axial direction of the magnetic bar.

In the embodiment of the present application, when the restraint block disposed on the inner surface of the tank body moves out of the restraint groove disposed on the outer surface of the cleaning column ring, the cleaning column ring starts to move along the axial direction of the magnetic bar, and the magnetic bar moves from the first region to the second region to start to clean the magnetic bar and the tank body. This method is simple in implementation and has strong operability.

In one possible implementation manner, the second restraint structure further includes a rotating mechanism, and the rotating mechanism is configured to rotate the restraint block so that the restraint block snaps into or moves out of the restraint groove.

In the embodiment of the present application, when the restraint block snaps into the restraint groove, the cleaning column ring is fixed on the magnetic bar. When the restraint block moves out of the restraint groove, the cleaning column ring moves along the axial direction of the magnetic bar to start the cleaning process. The rotating mechanism is provided, and the rotating mechanism is configured to control the positional relationship between the restraint block and the restraint groove so as to control the fixation and movement of the cleaning column ring. This means is simple and convenient, and is beneficial for wide application in the production process.

In one possible implementation manner, a first end of the tank body close to the first region is provided with a first air inlet, a second end of the tank body close to the second region is provided with a sewage outlet, and the first air inlet and the sewage outlet are opened to allow the cleaning column ring to move toward the second end.

In the embodiment of the present application, the first end of the tank body close to the first region is provided with the first air inlet. The second end of the tank body close to the second region is provided with the sewage outlet. When the first air inlet and the sewage outlet are opened, the cleaning column ring uses the power of the air to realize an automatic descending movement and starts to clean the magnetic bar and the tank body. In addition, by setting the sewage outlet, cleaning materials cleaned out by the cleaning column ring are discharged through a sewage pipeline. The cleaning process and the sewage discharging process are all in contactless designs, and the device does not need to be opened, which can meet production safety requirements.

In one possible implementation manner, the slurry iron remover further includes a sewage tank, where the sewage tank is connected to the sewage outlet, and the sewage tank is configured to collect cleaning materials of the cleaning column ring.

In the embodiment of the present application, the first end of the tank body is provided with the sewage outlet, and the sewage outlet is connected to the sewage tank. When the cleaning column ring uses the air power to start the cleaning process, the sewage tank cooperates with the sewage outlet without opening the device or contacting the slurry, so as to realize automatic sewage discharge.

In one possible implementation manner, a first breather is disposed on the sewage tank, and the first breather is configured to absorb gas in the sewage tank.

In the embodiment of the present application, setting the first breather on the sewage tank can not only achieve air pressure balance in the tank body to ensure that the cleaning column ring can normally descend along the axial direction of the magnetic bar during the cleaning process, but also can adsorb the slurry in the gas discharged from the tank body to prevent chemicals from being discharged to the outside, and further ensure safety during the production process.

In one possible implementation manner, the second end of the tank body is provided with a second air inlet, the first end of the tank body is provided with an air outlet, and the second air inlet and the air outlet are opened to allow the cleaning column ring to move toward the first end.

In the embodiment of the present application, the second end of the tank body is provided with the second air inlet, and the first end of the tank body is provided with the air outlet. When the second air inlet and the air outlet are opened, the cleaning column ring can use the power of air to realize automatic ascending movement and moves from the bottom of the tank body to the first region. By controlling the second air inlet and the air outlet, automatic ascending and descending movement of the cleaning column ring is realized. The device has a simple structure, a low failure rate, and does not require an additional mechanical structure.

In one possible implementation manner, a second breather is disposed on the air outlet, and the second breather is configured to absorb gas from the air outlet.

In the embodiment of the present application, setting the second breather on the air outlet can not only achieve air pressure balance in the tank body, so as to ensure that the cleaning column ring can normally ascend along the axial direction of the magnetic bar during the automatic ascending process, but also can adsorb the slurry discharged from the gas, so as to prevent chemicals from being discharged to the outside and ensure safety during the production process.

In one possible implementation manner, the tank body is provided with a slurry inlet and a slurry outlet, the slurry inlet is located at one end of the second region close to the first region, the slurry outlet is located at one end of the second region away from the first region, the slurry inlet is configured to introduce the slurry into the tank body, and the slurry outlet is configured to discharge the slurry from the tank body.

In the embodiment of the present application, when the slurry does not enter the tank body, the slurry iron remover does not adsorb the iron particles in the slurry, and the cleaning column ring is located in the first region. The slurry inlet and the slurry outlet are disposed in the second region, and the slurry inlet is disposed in the upper part of the second region, and the slurry outlet is disposed in the lower part of the second region. On the one hand, the slurry can be discharged from the tank body by means of its own gravity; on the other hand, the slurry can only cover the second region of the tank body, so as to keep the first region of the tank body clean, thereby reducing maintenance cost of the device.

BRIEF DESCRIPTION OF THE DRAWINGS

In order to illustrate technical solutions in embodiments of the present application more clearly, the following briefly introduces accompanying drawings required for describing the embodiments of the present application. Obviously, the following described accompanying drawings are merely some embodiments of the present application, and those of ordinary skill in the art may still derive other drawings from these accompanying drawings without involving creative efforts.

Figure 1:
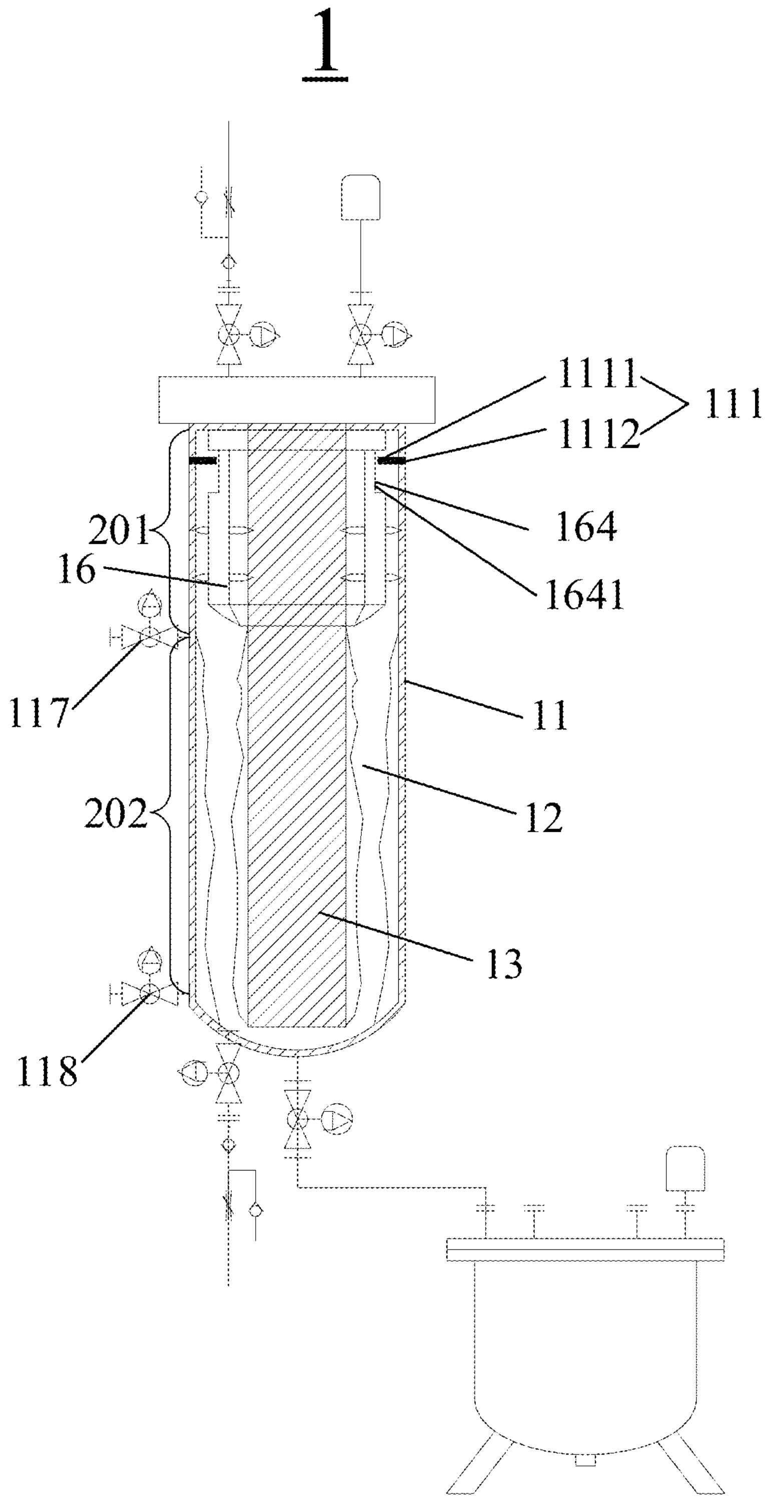
FIG. 1 is a schematic structural diagram of a slurry iron remover according to an embodiment of the present application.

Reference signs in description of embodiments are as follows:

slurry iron remover 1;

tank body 11, slurry 12, magnetic bar 13, cleaning column ring 16;

second restraint structure 111, first air inlet 112, sewage outlet 113, sewage tank 114, second air inlet 115, air outlet 116, slurry inlet 117, slurry outlet 118, column ring body 161, inner scraping diaphragm 162, outer scraping diaphragm 163, first restraint structure 164;

restraint block 1111, rotating mechanism 1112, first breather 1141, second breather 1161, restraint groove 1641.

DESCRIPTION OF EMBODIMENTS

The technical solutions of the embodiments of the present application will be described in detail below in conjunction with the accompanying drawings. The following embodiments are only used to illustrate the technical solutions of the present application more clearly, and thus serve only as examples, but not to limit the protection scope of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms “comprising” and “having” and any variations thereof in the specification and the claims of the present application as well as the foregoing description of the drawings are intended to cover non-exclusive inclusions.

In the description of the embodiments of the present application, technical terms such as “first” and “second” are only used to distinguish different objects, and cannot be understood as indicating or implying relative importance or implicitly specifying the number, specific order or primary and secondary relations of the referred technical features. In the description of the embodiments of the present application, the phrase “a plurality of” means two or more, unless otherwise explicitly specified.

A word “embodiment” referred to herein means that a particular feature, structure, or characteristic described in combination with the embodiment can be included in at least one embodiment of the present application. The appearances of the word in various places in the specification are not necessarily all referring to the same embodiment, or separate or alternative embodiments mutually exclusive of other embodiments. Those skilled in the art understand, in explicit and implicit manners, that an embodiment described herein may be combined with other embodiments.

In the description of the embodiments of the present application, the term “and/or” is only a kind of association relationship describing associated objects, which means that there may be three kinds of relationships. For example, A and/or B may mean the following three cases: A exists alone, both A and B exist at the same time, and B exists alone. In addition, the character “/” herein generally indicates that the associated objects before and after the character are in an “or” relationship.

In the description of the embodiments of the present application, the phrase “a plurality of” means two or more (including two). Similarly, the phrase “a plurality of groups of” means two groups or more (including two groups), and the phrase “a plurality of pieces of” means two pieces or more (including two pieces).

In the description of the embodiments of the present application, orientations or positional relationships indicated by technical terms such as “center”, “longitudinal”, “horizontal”, “length”, “width”, “thickness”, “upper”, “lower”, “front”, “back”, “left”, “right”, “vertical”, “horizontal”, “top”, “bottom”, “inner”, “outer”, “clockwise”, “counter-clockwise”, “axial”, “radial”, and “circumferential” are orientations or positional relationships shown based on drawings, are only for the convenience of describing the embodiments of the present application and simplifying the description, and do not indicate or imply that an apparatus or element referred to must have a specific orientation, or be constructed and operated in a specific orientation, and therefore cannot be understood as limitations to the present application.

In the description of the embodiments of the present application, unless otherwise explicitly specified and defined, technical terms such as “installation”, “interconnection", "connection", and "fixing" should be interpreted in a broad sense, for example, it may be a fixed connection, or a detachable connection, or an integrated connection; or it may be a mechanical connection, or an electrical connection; or it may be a direct connection, or an indirect connection through an intermediate medium, or it may be communication of the interior of two elements or interaction between two elements. Those of ordinary skill in the art can understand the specific meanings of the above terms in the embodiments of the present application according to specific situations.

In fields such as an energy storage device, liquid slurry is often used as raw material to produce the subsequent energy storage device. Since the raw material of the slurry itself contains a certain amount of iron components, there will be metal iron particles in the slurry, which will affect the quality of a subsequent battery product. Therefore, as the requirements for the energy storage device increase, people pay more and more attention to the problem of metal particles in the slurry, and also put forward growing requirements for an iron removal device.

With the further development of iron removal technology, new technologies come into being continuously in aspects of comprehensively improving iron removal effect and facilitating cleaning of iron particles. Permanent magnetic bar slurry iron removers in the related art usually use lifting and lowering iron removal components to complete an iron removal task. However, in the actual application process of this type of iron remover in a mechanical structure, it has a complex structure, a long operating cycle, and a high failure rate, which requires a plenty of manpower and cost for maintenance. In addition, when this type of iron remover cleans a magnetic bar inside a device, a cover needs to be opened, which takes up a lot of space. When the cover is opened, chemicals will be exposed, which causes harm to the health of the staff, and brings about some mechanical safety risks.

In view of this, embodiments of the present application provide a brand new slurry iron remover, which can not only enable the slurry iron remover to automatically clean slurry and improve iron removal effect and efficiency, but also can clean the interior of a device without opening the device and ensure safety of personnel and the device during the cleaning process, so as to achieve comprehensive integration of improving the iron removal effect and efficiency, cleaning the interior of the device conveniently and reducing device investment.

FIG. 1 is a schematic structural diagram of a slurry iron remover according to an embodiment of the present application. As shown in FIG. 1, the slurry iron remover 1 includes a tank body 11 configured to contain slurry 12; a magnetic bar 13 disposed in the tank body 11, where the magnetic bar 13 is configured to adsorb iron particles in the slurry 12; and a cleaning column ring 16 disposed in the tank body 11 and surrounding the magnetic bar 13, where the cleaning column ring 16 is fitted to an outer surface of the magnetic bar 13 and an inner surface of the tank body 11 respectively, and the cleaning column ring 16 is configured to move along an axial direction of the magnetic bar 13 after the slurry 12 is discharged from the tank body 11 to clean the tank body 11 and the magnetic bar 13.

The tank body 11 is configured to contain the slurry 12. The magnetic bar 13 and the cleaning column ring 16 are included in the tank body 11. The tank body 11 may be a cylinder, a cuboid or other shapes, which is not limited in the present application.

The magnetic bar 13 is mainly configured to absorb iron-containing impurities and other energetic and magnetic substances in liquid, and is widely used in fields such as chemical industry, food, and waste recycling. The magnetic bar 13 is composed of an inner magnetic core and an outer cladding. The magnetic core is composed of a cylindrical magnet block and a conductive magnet iron sheet. A good magnetic bar 13 should have a uniform spatial distribution of magnetic induction lines, and the maximum magnetic induction intensity point distribution should fill the entire magnetic bar 13 as much as possible. The magnetic bar 13 should be smooth and have low resistance in surface, does not contain environmentally harmful substances and can avoid contamination of materials and environment.

The magnetic bar 13 may be a cylinder, a cuboid or other shapes, which is not limited in the present application.

In the above solution, the magnetic bar 13 is disposed in the tank body 11 to absorb iron particles in the slurry 12 contained in the tank body 11. The cleaning column ring 16 is disposed in the tank body 11 and surrounds the magnetic bar 13. In this way, when the cleaning column ring 16 moves along the axial direction of the magnetic bar 13, the tank body 11 and the magnetic bar 13 can be cleaned, so as to enable the slurry iron remover 1 to automatically clean the iron particles in the slurry 12. The cleaning column ring 16 is fitted to the tank body 11 and the magnetic bar 13 to comprehensively clean the tank body 11 and the magnetic bar 13, so as to allow the slurry iron remover 1 to clean a component in the interior of a device by itself. Moreover, the device does not need to be opened in the process in which the slurry iron remover 1 cleans the interior of the device by itself. Therefore, on the one hand, no chemicals will be exposed to the air, which meets chemical safety requirements, and on the other hand, safety risks caused by opening the device can be reduced.

Figure 2:
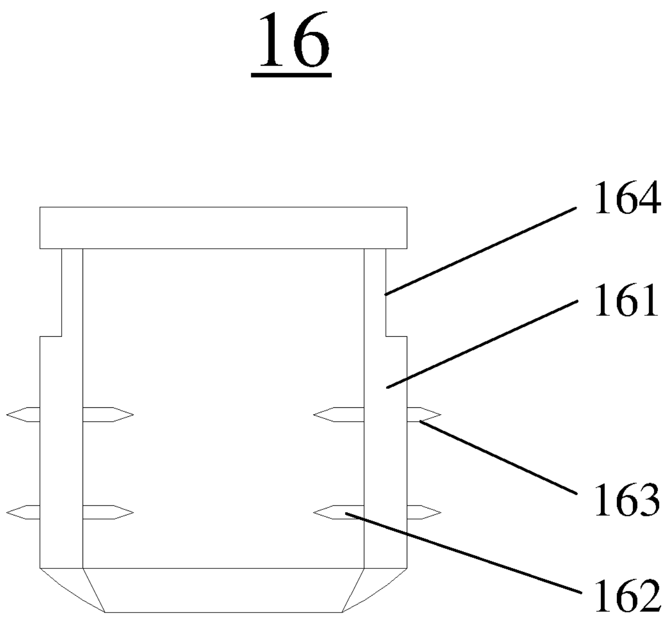
FIG. 2 is a schematic structural diagram of a cleaning column ring according to an embodiment of the present application.

FIG. 2 is a schematic structural diagram of a cleaning column ring according to an embodiment of the present application. As shown in the figure, the cleaning column ring 16 includes a column ring body 161; an inner scraping diaphragm 162 disposed on an inner surface of the column ring body 161 and fitted to the outer surface of the magnetic bar 13, where the inner scraping diaphragm 162 is configured to clean the magnetic bar 13; and an outer scraping diaphragm 163 disposed on an outer surface of the column ring body 161 and fitted to the inner surface of the tank body 11, where the outer scraping diaphragm 163 is configured to clean the tank body 11.

In the embodiment of the present application, the inner scraping diaphragm 162 and the outer scraping diaphragm 163 may be made of non-metallic solid materials, that is, a type of materials like plastic and rubber, or other materials, which is not limited in the present application.

The cleaning column ring 16 is disposed between the magnetic bar 13 and the tank body 11. Therefore, if only one cleaning component is provided on the cleaning column ring 16, both the tank body 11 and the magnetic bar 13 cannot be cleaned at the same time, so residual slurry 12 or metal iron particles will still exist in the interior of the device.

In the above solution, the inner scraping diaphragm 162 and the outer scraping diaphragm 163 are disposed in the cleaning column ring 16. The inner scraping diaphragm 162 is configured to clean the outer surface of the magnetic bar 13, and the outer scraping diaphragm 163 is configured to clean the inner surface of the tank body 11. By setting different cleaning components on the cleaning column ring 16, the inner surface of the tank body 11 and the outer surface of the magnetic bar 13 can be cleaned simultaneously, thereby improving self-cleaning effect of components such as the tank body 11 and the magnetic bar 13 in the slurry iron remover 1.

Figure 3:
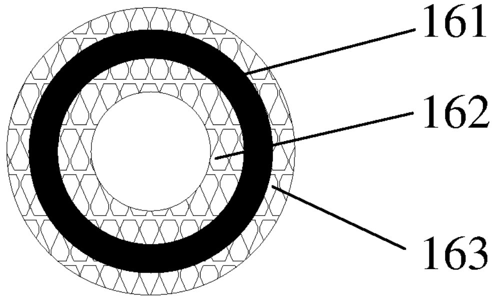
FIG. 3 is a top view of a cleaning column ring according to an embodiment of the present application.

FIG. 3 is a top view of a cleaning column ring according to an embodiment of the present application. In the embodiment of the present application, as shown in the figure, the inner scraping diaphragm 162 and the outer scraping diaphragm 163 are each in a sheet-shaped circular ring structure.

The cleaning column ring 16 surrounds the magnetic bar 13, that is, a part of the magnetic bar 13 in contact with the cleaning column ring 16 is completely covered by the cleaning column ring 16. If the inner scraping diaphragm 162 and the outer scraping diaphragm 163 disposed on the cleaning column ring 16 have a circular ring structure, the inner scraping diaphragm 162 can be enabled to surround the magnetic bar 13, and the outer scraping diaphragm 163 can be enabled to surround the cleaning column ring 16 and then be in complete contact with the inner surface of the tank body 11.

In the above solution, the cleaning column ring 16 is disposed in the tank body 11 and surrounds the magnetic bar 13. When the inner scraping diaphragm 162 and the outer scraping diaphragm 163 on the cleaning column ring 16 are both in a sheet-shaped circular ring structure, the inner scraping diaphragm 162 and the outer scraping diaphragm 163 can respectively clean all parts of the tank body 11 and the magnetic bar 13 to avoid an uncleaned region on the tank body 11 and the magnetic bar 13.

In the embodiment of the present application, the cleaning column ring 16 includes a plurality of inner scraping diaphragms 162 and a plurality of outer scraping diaphragms 163 distributed along the axial direction of the magnetic bar 13.

During the cleaning process, the cleaning column ring 16 moves along the axial direction of the magnetic bar 13 to clean the tank body 11 and the magnetic bar 13. The plurality of inner scraping diaphragms 162 and outer scraping diaphragms 163 are distributed along the axial direction of the magnetic bar 13, that is, the plurality of inner scraping diaphragms 162 and outer scraping diaphragms 163 are disposed along the movement direction of the cleaning column ring 16.

In the above solution, the cleaning column ring 16 surrounds the magnetic bar 13. When the plurality of inner scraping diaphragms 162 and the plurality of outer scraping diaphragms 163 are distributed along the axial direction of the magnetic bar 13, both the entire outer surface of the magnetic bar 13 and the inner surface of the tank body 11 can be cleaned by the inner scraping diaphragms 162 and the outer scraping diaphragms 163. Moreover, part of the outer surface region of the magnetic bar 13 and part of the inner surface region of the tank body 11 can be cleaned multiple times, and setting the plurality of inner scraping diaphragms 162 and outer scraping diaphragms 163 at the same time can improve the cleaning efficiency.

In the embodiment of the present application, before the slurry 12 enters the tank body 11, the cleaning column ring 16 is located in a first region 201 of the magnetic bar 13; after the slurry 12 enters the tank body 11, the slurry 12 covers a second region 202 of the tank body 11, and the first region 201 and the second region 202 do not overlap; and after the slurry 12 is discharged from the tank body 11, the cleaning column ring 16 moves into the second region 202 along the axial direction of the magnetic bar 13 to clean the tank body 11 and the magnetic bar 13.

The magnetic bar 13 is disposed in the tank body 11, so the first region of the magnetic bar 13 is equivalent to a first region of the tank body 11, and the second region of the tank body 13 is equivalent to a second region of the magnetic bar 11.

When there is no slurry 12 in the tank body 11, the cleaning column ring 16 is located at the upper part of the magnetic bar 13, that is, the first region. When the slurry 12 enters the tank body 11, the slurry 12 covers the second region of the tank body 11. When the slurry 12 is in the second region of the tank body 11, the magnetic bar 13 adsorbs the iron particles in the slurry 12. After the iron particles in the slurry 12 are adsorbed, cleanliness of the slurry 12 is improved, and the slurry 12 is discharged from the tank body 11.

In the above solution, the cleaning column ring 16 is disposed in the first region, and the slurry 12 covers the second region. After the slurry 12 is discharged from the tank body 11, the cleaning column ring 16 moves along the axial direction of the magnetic bar 13, so that the cleaning column ring 16 moves from the first region to the second region to clean the tank body 11 and the magnetic bar 13. This kind of slurry iron remover 1 can automatically clean the component in the interior of the device, and can save operation and maintain manpower.

In the embodiment of the present application, an outer surface of the cleaning column ring 16 is provided with a first restraint structure 164, the inner surface of the tank body 11 is provided with a second restraint structure 111, and the first restraint structure 164 and the second restraint structure 111 are configured to fix the cleaning column ring 16 to the first region of the magnetic bar 13.

When the slurry 12 does not enter the tank body 11, that is, the slurry iron remover 1 does not absorb the iron particles in the slurry 12, the cleaning column ring 16 does not need to clean the tank body 11 and the magnetic bar 13, and the cleaning column ring 16 needs to be fixed in the first region of the magnetic bar 13. When there are metal iron particles in the slurry 12 that need to be cleaned, the slurry 12 enters the tank body 11 from the second region of the tank body 11 to use the magnetic bar 13 in the slurry iron remover 1 to absorb the iron particles in the slurry 12. The first region and the second region do not overlap.

In the above solution, before the process of cleaning the tank body 11 and the magnetic bar 13 by the cleaning column ring 16, the cleaning column ring 16 is fixedly disposed in the first region of the magnetic bar. If the cleaning column ring 16 is located in the second region at this time, it will prevent the slurry 12 containing metal particles from entering the tank body 11, thereby affecting the effect of the magnetic bar 13 on adsorbing the iron particles in the slurry 12. By setting the first restraint structure 164 and the second restraint structure 111 on the outer surface of the cleaning column ring 16 and the inner surface of the tank body 11 respectively, the cleaning column ring 16 can be fixed, thereby ensuring normal operation of the slurry iron remover 1.

In the embodiment of the present application, the first restraint structure 164 includes a restraint groove 1641, the second restraint structure 111 includes a restraint block 1111, and the restraint block 1111 snaps into the restraint groove 1641 to fix the cleaning column ring 16 to the first region of the magnetic bar 13.

In the above solution, the restraint block 1111 is disposed on the inner surface of the tank body 11, and the restraint groove 1641 is disposed on the outer surface of the cleaning column ring 16. The fixing of the cleaning column ring 16 to the first region of the magnetic bar 13 is realized through the cooperation of the restraint groove 1641 and the restraint block 1111. This method has low cost, low energy consumption and good practical performance.

In the embodiment of the present application, the restraint block 1111 moves out of the restraint groove 1641 so that the cleaning column ring 16 moves along the axial direction of the magnetic bar 13.

In the above solution, when the restraint block 1111 disposed on the inner surface of the tank body 11 moves out of the restraint groove 1641 disposed on the outer surface of the cleaning column ring 16, the cleaning column ring 16 starts to move along the axial direction of the magnetic bar, and the magnetic bar 13 moves from the first region to the second region to start to clean the tank body 11 and the magnetic bar 13. This method is simple in implementation and has strong operability.

In the embodiment of the present application, the second restraint structure 111 further includes a rotating mechanism 1112, and the rotating mechanism 1112 is configured to rotate the restraint block 1111 so that the restraint block 1111 snaps into or moves out of the restraint groove 1641.

When the restraint block 1111 snaps into the restraint groove 1641, the cleaning column ring 16 is fixed in the first region of the magnetic bar 13, which does not prevent the slurry 12 from entering or discharging from the second region of the tank body 11. When the restraint block 1111 moves out of the restraint groove 1641, the cleaning column ring 16 moves along the axial direction of the magnetic bar 13 to start the cleaning process. If it is desired to control the movement and fixation of the cleaning column ring 16 by the restraint block 1111 snapping into the restraint groove 1641 or moving out of the restraint groove 1641, another structure is needed to control the restraint block 1111 accordingly.

In the above solution, the rotating mechanism 1112 is provided, and the rotating mechanism 1112 is configured to control the positional relationship between the restraint block 1111 and the restraint groove 1641 so as to control the fixation and movement of the cleaning column ring 16. This means is simple and convenient, and is beneficial for wide application in the production process.

Figure 4:
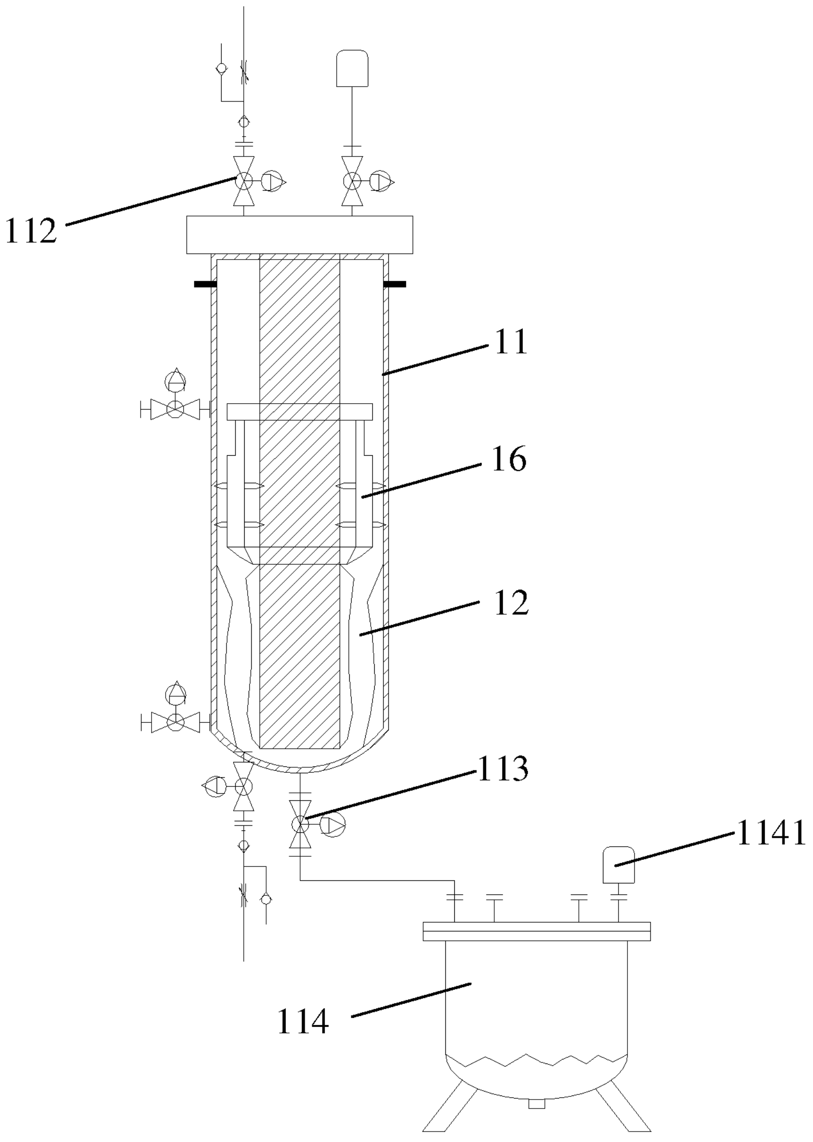
FIG. 4 is a schematic structural diagram of a slurry iron remover according to another embodiment of the present application.

FIG. 4 is a schematic structural diagram of a slurry iron remover according to another embodiment of the present application. As shown in FIG. 4, a first end of the tank body 11 close to the first region is provided with a first air inlet 112, a second end of the tank body 11 close to the second region is provided with a sewage outlet 113, and the first air inlet 112 and the sewage outlet 113 are opened to allow the cleaning column ring 16 to move toward the second end.

After the slurry 12 enters the tank body 11 to absorb the metal iron particles, the slurry 12 is discharged from the tank body 11, there will be residual slurry 12 in the tank body 11, and there will be adsorbed metal iron particles and a small amount of slurry 12 remaining on the magnetic bar 13. At this time, the first air inlet 112 and the sewage outlet 113 are opened, and then the rotating mechanism 1112 is rotated, so that the cleaning column ring 16 starts to move along the axial direction of the magnetic bar 13 under the push of compressed air, and the inner scraping diaphragm 162 and the outer scraping diaphragm 163 on the cleaning column ring 16 start to clean the tank body 11 and the magnetic bar 13. When the cleaning column ring 16 descends to the bottom of the tank body 11, that is, after the cleaning process is completed, the first air inlet 112 and the sewage outlet 113 are closed.

In the above solution, the tank body 11 is sealed by a top cover to form a sealed space. The first end of the tank body 11 close to the first region is provided with the first air outlet 112, that is, an upper part outside the tank body 11 is provided with the first air outlet 112. The second end of the tank body 11 close to the second region is provided with the sewage outlet 113, that is, a lower part outside the tank body 11 is provided with the sewage outlet 113. When the first air inlet 112 and the sewage outlet 113 are opened, the cleaning column ring 16 uses the power of the air to realize an automatic descending movement and starts to clean the tank body 11 and the magnetic bar 13. In addition, by setting the sewage outlet 113, cleaning materials cleaned out by the cleaning column ring 16 are discharged through a sewage pipeline. The cleaning process and the sewage discharging process are all in contactless designs, and the device does not need to be opened, which can meet higher occupational health needs and device safety requirements.

In the embodiment of the present application, the slurry iron remover 1 further includes a sewage tank 114, where the sewage tank 114 is connected to the sewage outlet 113, and the sewage tank 114 is configured to collect cleaning materials of the cleaning column ring 16.

The sewage tank 114 may be a plastic container, a glass container, or a container made of other materials, as long as it is a container made of any material that meets the conditions for storing the slurry 12, which is not limited in the present application.

In the above solution, the first end of the tank body 11 is provided with the sewage outlet 113, and the sewage outlet 113 and the sewage tank 114 are connected through a pipeline. When the cleaning column ring 16 uses the air power to start the cleaning process, the sewage tank 114 cooperates with the sewage outlet 113 without opening the slurry iron remover 1 or contacting the slurry 12, so as to realize automatic sewage discharge.

In the embodiment of the present application, a first breather 1141 is disposed on the sewage tank 114, and the first breather 1141 is configured to absorb gas in the sewage tank 114.

The first breather 1141 is a new type of filtration device. It can filter particles and bacteria in a size above 0.22 μm in liquid, and has advantages such as high filtration precision, fast filtration speed, less adsorption, no media shedding, acid and alkali corrosion resistance, high temperature resistance, and easy operation. It is now widely used in industries such as medicine, chemical industry, electronics, beverages, fruit wine, biochemical water treatment, and environmental protection. It is mainly used to prevent impurities and harmful bacteria and microorganisms in the air from entering a tank body, production lines, sterile room, etc., and causing changes in water quality, products and sterile room environment.

In the above solution, setting the first breather 1141 on the sewage tank 114 can not only achieve air pressure balance in the tank body 11 to ensure that the cleaning column ring 16 can normally descend along the axial direction of the magnetic bar 13 during the cleaning process, but also can adsorb the slurry 12 in the gas discharged from the tank body 11 to prevent chemicals from being discharged to the outside, and further ensure safety during the production process.

Figure 5:
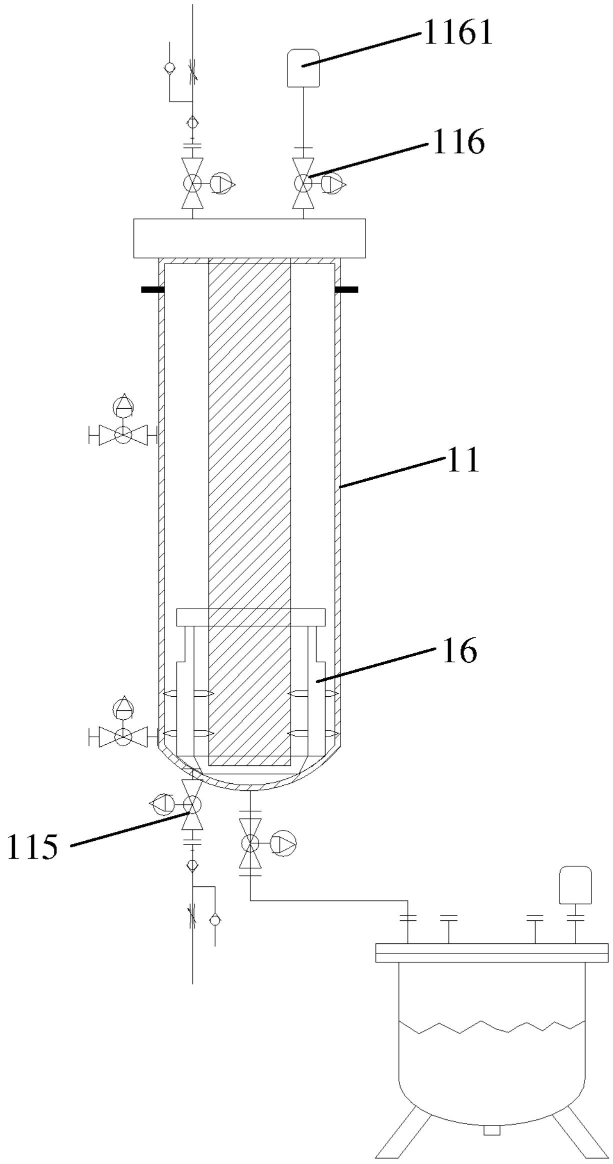
FIG. 5 is a schematic structural diagram of a slurry iron remover according to yet another embodiment of the present application.

FIG. 5 is a schematic structural diagram of a slurry iron remover according to yet another embodiment of the present application. As shown in FIG. 5, the second end of the tank body 11 is provided with a second air inlet 115, the first end of the tank body 11 is provided with an air outlet 116, and the second air inlet 115 and the air outlet 116 are opened to allow the cleaning column ring 16 to move toward the first end.

When the cleaning column ring 16 descends to the bottom of the tank body 11, that is, after the cleaning process is completed, the cleaning column ring 16 needs to return to the first region of the magnetic bar 13 again. At this time, the second air inlet 115 and the second air outlet 116 are opened, so that the cleaning column ring 16 starts an ascending movement along the axial direction of the magnetic bar under the push of the compressed air. When the cleaning column ring 16 ascends in place, the rotating mechanism 1112 is rotated again so that the cleaning column ring 16 is fixed in the first region of the magnetic bar 13. After fixing the cleaning column ring 16, the ascending process of the cleaning column ring 16 is completed, and the second air inlet 115 and the air outlet 116 are closed.

In the above solution, the second end of the tank body 11 is provided with the second air inlet 115, and the first end of the tank body 11 is provided with the air outlet 116. When the second air inlet 115 and the air outlet 116 are opened, the cleaning column ring 16 uses the power of compressed air to realize automatic ascending movement and moves from the bottom of the tank body 11 to the first region of the magnetic bar 13. By controlling the second air inlet 115 and the air outlet 116, automatic ascending and descending movement of the cleaning column ring 16 in the device is realized. The device has a simple structure, a low failure rate, and does not require an additional mechanical structure.

In the embodiment of the present application, a second breather 1161 is further disposed on the air outlet 116, and the second breather 1161 is configured to absorb gas from the air outlet 116.

The second breather 1161 is the same as the first breather 1141 and will not be described in detail here.

In the above solution, setting the second breather 1161 on the air outlet 116 can not only achieve air pressure balance in the tank body 11, so as to ensure that the cleaning column ring 16 can normally ascend along the axial direction of the magnetic bar 13 during the automatic ascending process, but also can adsorb the slurry 12 discharged from the gas, so as to prevent chemicals from being discharged to the outside and ensure safety during the production process.

In the embodiment of the present application, the tank body 11 is provided with a slurry inlet 117 and a slurry outlet 118, the slurry inlet 117 is located at one end of the second region close to the first region, the slurry outlet 118 is located at one end of the second region away from the first region, the slurry inlet 117 is configured to introduce the slurry 12 into the tank body 11, and the slurry outlet 118 is configured to discharge the slurry 12 from the tank body 11.

When the slurry 12 does not enter the tank body 11, the slurry iron remover 1 does not adsorb the iron particles in the slurry 12. At this time, the cleaning column ring 16 is located in the first region of the magnetic bar 13. The outer scraping diaphragm 163 of the cleaning column ring 16 is fitted to the tank body 11, that is, a part of the tank body 11 occupied by the cleaning column ring 16 cannot allow the slurry 12 to enter the tank body 11.

In the above solution, the slurry inlet 117 and the slurry outlet 118 are disposed in the second region, and the slurry inlet 117 is disposed in the upper part of the second region, and the slurry outlet 118 is disposed in the lower part of the second region. On the one hand, the slurry 12 can be discharged from the tank body 11 by means of its own gravity; on the other hand, the slurry 12 can only cover the second region of the tank body 11, so as to keep the first region of the tank body 11 clean, thereby reducing maintenance cost of the device.

Figure 6:
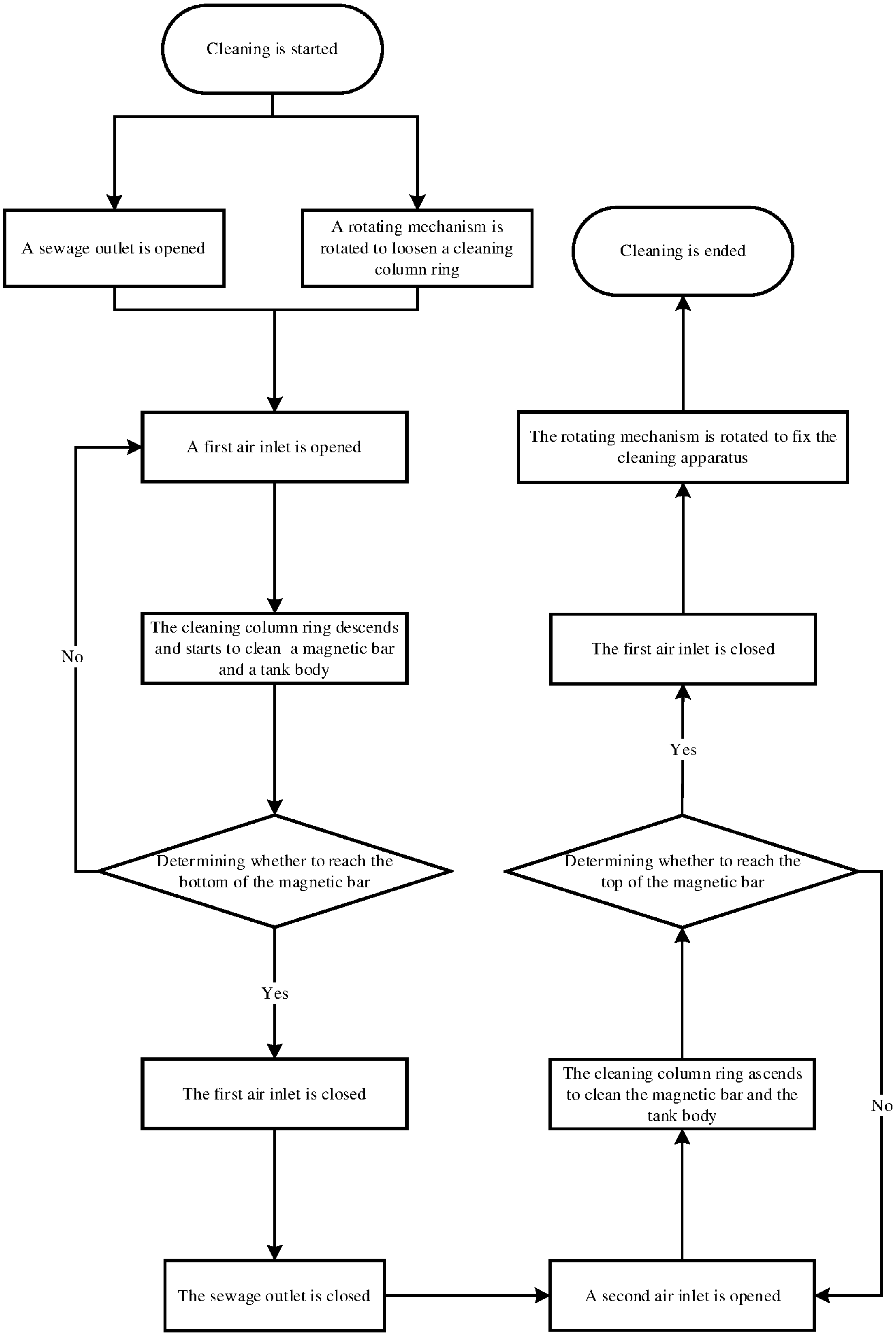
FIG. 6 is a schematic flowchart of self-cleaning of a slurry iron remover according to an embodiment of the present application.

FIG. 6 is a schematic flowchart of self-cleaning of a slurry iron remover according to an embodiment of the present application. As shown in FIG. 6, when a self-cleaning process of a slurry iron remover 1 is started, a sewage outlet 113 is opened, a rotating mechanism 1112 is rotated to loosen a cleaning column ring 16, and then a first air inlet 112 is opened so that the cleaning column ring 16 utilizes the power of the air to descend along an axial direction of a magnetic bar 13 and starts to clean a tank body 11 and the magnetic bar 13. When the cleaning column ring 16 reaches the bottom of the magnetic bar 13, the first air inlet 112 and the sewage outlet 113 are closed. If the cleaning column ring 16 does not reach the bottom of the magnetic bar 13, the first air inlet 112 is opened again so that the cleaning column ring 16 continues to descend along the axial direction of the magnetic bar 13 until the cleaning column ring 16 reaches the bottom of the magnetic bar 13. After the descending process of the cleaning column ring 16 is completed, a second air inlet 115 and an air outlet 116 are opened, and the cleaning column ring 16 ascends along the axial direction of the magnetic bar 13 to clean the magnetic bar 13 and the tank body 11 for a second time. When the cleaning column ring 16 reaches the top of the magnetic bar 13, the second air inlet 115 and the air outlet 116 are closed, and then the rotating mechanism 1112 is rotated so that the cleaning column ring 16 is fixed in a first region of the magnetic bar 13, and the self-cleaning process of the slurry iron remover 1 is completed. If the cleaning column ring 16 does not reach the top of the magnetic bar 13, the second air inlet 115 and the air outlet 116 are opened again so that the cleaning column ring 16 continues to ascend along the axial direction of the magnetic bar 13 until the cleaning column ring 16 reaches the top of the magnetic bar 13.

While the present application has been described with reference to some embodiments, various improvements may be made and equivalents may be used to substitute parts therein without departing from the scope of the present application. In particular, as long as there is no structural conflict, technical features mentioned in various embodiments can be combined in any manner. The present application is not limited to the specific embodiments disclosed herein, but includes all technical solutions falling within the scope of the claims.

What is claimed is:

1. A slurry iron remover, comprising:

a tank body configured to contain slurry;

a magnetic bar disposed in the tank body, wherein the magnetic bar is configured to absorb iron particles in the slurry; and a cleaning column ring disposed in the tank body and surrounding the magnetic bar, wherein the cleaning column ring is fitted to an outer surface of the magnetic bar and an inner surface of the tank body respectively, and the cleaning column ring is configured to move along an axial direction of the magnetic bar after the slurry is discharged from the tank body to clean the tank body and the magnetic bar;

wherein:

before the slurry enters the tank body, the cleaning column ring is located in a first region of the magnetic bar;

after the slurry enters the tank body, the slurry covers a second region of the tank body, the first region is closer to a first end of the tank body than the second region, the second region is closer to a second end of the tank body than the first region, the second end is opposite to the first end, and the first region and the second region do not overlap;

after the slurry is discharged from the tank body, the cleaning column ring moves into the second region along the axial direction of the magnetic bar to clean the tank body and the magnetic bar; and the tank body is provided with a slurry inlet and a slurry outlet, the slurry inlet is located at a first end of the second region closer to the first region than a second end of the second region, the slurry outlet is located the second end of the second region, the slurry inlet is configured to introduce the slurry into the tank body, and the slurry outlet is configured to discharge the slurry from the tank body.

2. The slurry iron remover according to claim 1, wherein the cleaning column ring comprises:

a column ring body;

an inner scraping diaphragm disposed on an inner surface of the column ring body and fitted to the outer surface of the magnetic bar, wherein the inner scraping diaphragm is configured to clean the magnetic bar; and an outer scraping diaphragm disposed on an outer surface of the column ring body and fitted to the inner surface of the tank body, wherein the outer scraping diaphragm is configured to clean the tank body.

3. The slurry iron remover according to claim 2, wherein the inner scraping diaphragm and the outer scraping diaphragm are each in a sheet-shaped circular ring structure.

4. The slurry iron remover according to claim 2, wherein the inner scraping diaphragm is one of a plurality of inner scraping diaphragms of the cleaning column ring and the outer scraping diaphragm is one of a plurality of outer scraping diaphragms of the cleaning column ring, and the plurality of inner scraping diaphragms and the plurality of outer scraping diaphragms are distributed along the axial direction of the magnetic bar.

5. The slurry iron remover according to claim 1, wherein an outer surface of the cleaning column ring is provided with a first restraint structure, the inner surface of the tank body is provided with a second restraint structure, and the first restraint structure and the second restraint structure are configured to fix the cleaning column ring to the first region of the magnetic bar.

6. The slurry iron remover according to claim 5, wherein the first restraint structure comprises a restraint groove, the second restraint structure comprises a restraint block, and the restraint block snaps into the restraint groove to fix the cleaning column ring to the first region of the magnetic bar.

7. The slurry iron remover according to claim 6, wherein the restraint block moves out of the restraint groove so that the cleaning column ring moves along the axial direction of the magnetic bar.

8. The slurry iron remover according to claim 5, wherein the second restraint structure further comprises a rotating mechanism, and the rotating mechanism is configured to rotate the restraint block so that the restraint block snaps into or moves out of the restraint groove.

9. The slurry iron remover according to claim 1, wherein the first end of the tank body is provided with a first air inlet, the second end of the tank body is provided with a sewage outlet, and the first air inlet and the sewage outlet are opened to allow the cleaning column ring to move toward the second end.

10. The slurry iron remover according to claim 9, further comprising:

a sewage tank, wherein the sewage tank is connected to the sewage outlet, and the sewage tank is configured to collect cleaning materials of the cleaning column ring.

11. The slurry iron remover according to claim 10, wherein a first breather is disposed on the sewage tank, and the first breather is configured to absorb gas in the sewage tank.

12. The slurry iron remover according to claim 9, wherein the second end of the tank body is further provided with a second air inlet, the first end of the tank body is further provided with an air outlet, and the second air inlet and the air outlet are opened to allow the cleaning column ring to move toward the first end.

13. The slurry iron remover according to claim 12, wherein a second breather is disposed on the air outlet, and the second breather is configured to absorb gas from the air outlet.

14. A slurry iron remover, comprising:

a tank body configured to contain slurry;

a magnetic bar disposed in the tank body, wherein the magnetic bar is configured to absorb iron particles in the slurry; and a cleaning column ring disposed in the tank body and surrounding the magnetic bar, wherein the cleaning column ring is fitted to an outer surface of the magnetic bar and an inner surface of the tank body respectively, and the cleaning column ring is configured to move along an axial direction of the magnetic bar after the slurry is discharged from the tank body to clean the tank body and the magnetic bar;

wherein:

before the slurry enters the tank body, the cleaning column ring is located in a first region of the magnetic bar;

after the slurry enters the tank body, the slurry covers a second region of the tank body, the first region is closer to a first end of the tank body than the second region, the second region is closer to a second end of the tank body than the first region, the second end is opposite to the first end, and the first region and the second region do not overlap;

after the slurry is discharged from the tank body, the cleaning column ring moves into the second region along the axial direction of the magnetic bar to clean the tank body and the magnetic bar;

an outer surface of the cleaning column ring is provided with a first restraint structure, the inner surface of the tank body is provided with a second restraint structure, and the first restraint structure and the second restraint structure are configured to fix the cleaning column ring to the first region of the magnetic bar; and the first restraint structure comprises a restraint groove, the second restraint structure comprises a restraint block, and the restraint block snaps into the restraint groove to fix the cleaning column ring to the first region of the magnetic bar.

15. A slurry iron remover, comprising:

a tank body configured to contain slurry;

a magnetic bar disposed in the tank body, wherein the magnetic bar is configured to absorb iron particles in the slurry; and a cleaning column ring disposed in the tank body and surrounding the magnetic bar, wherein the cleaning column ring is fitted to an outer surface of the magnetic bar and an inner surface of the tank body respectively, and the cleaning column ring is configured to move along an axial direction of the magnetic bar after the slurry is discharged from the tank body to clean the tank body and the magnetic bar;

wherein:

before the slurry enters the tank body, the cleaning column ring is located in a first region of the magnetic bar;

after the slurry enters the tank body, the slurry covers a second region of the tank body, the first region is closer to a first end of the tank body than the second region, the second region is closer to a second end of the tank body than the first region, the second end is opposite to the first end, and the first region and the second region do not overlap;

after the slurry is discharged from the tank body, the cleaning column ring moves into the second region along the axial direction of the magnetic bar to clean the tank body and the magnetic bar; and the first end of the tank body is provided with a first air inlet, the second end of the tank body is provided with a sewage outlet, and the first air inlet and the sewage outlet are opened to allow the cleaning column ring to move toward the second end.

* * * * *